US011983746B2

(12) United States Patent
Choudhary et al.

(10) Patent No.: US 11,983,746 B2
(45) Date of Patent: May 14, 2024

(54) USER INTERFACE AND PROCESS FLOW FOR PROVIDING AN INTENT SUGGESTION TO A USER IN A TEXT-BASED CONVERSATIONAL EXPERIENCE WITH USER FEEDBACK

(71) Applicant: Helpshift, Inc., San Francisco, CA (US)

(72) Inventors: Amit Choudhary, Pune (IN); Swaroop Chitlur Haridas, Dublin, CA (US); Christian Leipski, Boulder Creek, CA (US); Yashkumar Gandhi, Pune (IN); Shyam Hirachand Shinde, Pune (IN)

(73) Assignee: Helpshift, Inc., San Francisco, CA (US)

( * ) Notice: Subject to any disclaimer, the term of this patent is extended or adjusted under 35 U.S.C. 154(b) by 350 days.

(21) Appl. No.: 17/153,228

(22) Filed: Jan. 20, 2021

(65) Prior Publication Data

US 2021/0224818 A1 Jul. 22, 2021

Related U.S. Application Data

(60) Provisional application No. 62/964,548, filed on Jan. 22, 2020, provisional application No. 62/964,539, filed on Jan. 22, 2020.

(51) Int. Cl.
G06Q 30/00 (2023.01)
G06F 3/0482 (2013.01)
(Continued)

(52) U.S. Cl.
CPC ....... *G06Q 30/0281* (2013.01); *G06F 3/0482* (2013.01); *G06F 16/3329* (2019.01);
(Continued)

(58) Field of Classification Search
None
See application file for complete search history.

(56) References Cited

U.S. PATENT DOCUMENTS 11,223,540 B1 * 1/2022 Lilley ................... H04L 67/306
2002/0052894 A1   5/2002 Bourdoncle et al.
(Continued)

OTHER PUBLICATIONS

International Searching Authority; Notification of Transmittal of International Search Report and Written Opinion; dated Apr. 6, 2021; PCT Application No. PCT/US21/14126; pp. 1-8.

(Continued)

*Primary Examiner* — Mila Airapetian
(74) *Attorney, Agent, or Firm* — FisherBroyles LLP; Alan D. Minsk

(57) ABSTRACT

Systems, apparatuses, and methods for providing a more effective customer service support system. In some embodiments, the systems, apparatuses, and methods include a user interface (UI) and process flow for implementing a conversation-based customer service support system. The user interface and associated processing enable a user/customer to quickly and accurately select an intent, goal, or purpose of their customer service request. In some embodiments, this is achieved by a set of user interface displays or screens and an underlying logic that provide a user with multiple ways of selecting, identifying, or describing the intent, goal, or purpose of their request for service or assistance.

19 Claims, 7 Drawing Sheets

(51) Int. Cl.

| | | |
|---|---|---|
| *G06F 16/332* | (2019.01) | |
| *G06F 16/35* | (2019.01) | |
| *G06F 18/2415* | (2023.01) | |
| *G06F 40/284* | (2020.01) | |
| *G06F 40/44* | (2020.01) | |
| *G06N 5/04* | (2023.01) | |
| *G06N 20/00* | (2019.01) | |
| *G06Q 30/012* | (2023.01) | |
| *G06Q 30/016* | (2023.01) | |
| *G06Q 30/02* | (2023.01) | |
| *G06Q 30/0601* | (2023.01) | |
| *G06F 40/289* | (2020.01) | |
| *G06F 40/30* | (2020.01) | |
| *G06Q 10/10* | (2023.01) | |

(52) U.S. Cl.
CPC ...... *G06F 16/355* (2019.01); *G06F 18/24155* (2023.01); *G06F 40/284* (2020.01); *G06F 40/44* (2020.01); *G06N 5/04* (2013.01); *G06N 20/00* (2019.01); *G06Q 30/012* (2013.01); *G06Q 30/016* (2013.01); *G06Q 30/0613* (2013.01); *G06F 40/289* (2020.01); *G06F 40/30* (2020.01); *G06Q 10/10* (2013.01)

(56) References Cited

U.S. PATENT DOCUMENTS

| | | |
|---|---|---|
| 2009/0019026 A1 | 1/2009 | Valdes-Perez et al. |
| 2009/0100371 A1 | 4/2009 | Hu |
| 2015/0169285 A1 | 6/2015 | Reyes et al. |
| 2016/0196561 A1 | 7/2016 | Iyer et al. |
| 2018/0285775 A1 | 10/2018 | Bergen |
| 2019/0180175 A1 | 6/2019 | Meteer et al. |
| 2019/0278870 A1 | 9/2019 | Novielli et al. |
| 2020/0184019 A1* | 6/2020 | Yu .................. G06F 16/285 |
| 2020/0394360 A1* | 12/2020 | Dunn .................. G06F 40/169 |

OTHER PUBLICATIONS

Notification of Transmittal of the International Search Report and Written Opinion of the International Searching Authority; dated Apr. 5, 2021; PCT Application No. PCT/US21/14158; pp. 1-12.
European Patent Office; "Extended European Search Report" dated Feb. 9, 2024; EP Application No. 21744092.4; pp. 1-7 (2024).
Analytics Vidhya; "Ultimate Guide to Understand & Implement Natural Language Processing"; XP055855264, Retrieved from the Internet: "URL:https://web.archive.org/web/20170721004947/https://www.analyticsvidhya.com/blog/2017/01/ultimate-guide-to-understand-implement-natural-language-processing-codes-inpython/"[retrieved on Oct. 26, 2021]; * the whole document* (2017).
European Patent Office; "Extended European Search Report" dated Feb. 13, 2024; EP Application No. 21744473.6; pp. 1-7 (2024).

* cited by examiner

USER INTERFACE AND PROCESS FLOW FOR PROVIDING AN INTENT SUGGESTION TO A USER IN A TEXT-BASED CONVERSATIONAL EXPERIENCE WITH USER FEEDBACK

CROSS REFERENCE TO RELATED APPLICATIONS

This application claims the benefit of U.S. Provisional Application No. 62/964,539, entitled "User Interface and Process Flow for Providing an Intent Suggestion to a User in a Text-Based Conversational Experience with User Feedback," filed Jan. 22, 2020, the disclosure of which is incorporated, in its entirety (including the Appendix), by this reference.

This application also claims the benefit of U.S. Provisional Application No. 62/964,548, entitled "System, Apparatus and Methods for Providing an Intent Suggestion to a User in a Text-Based Conversational Experience with User Feedback," filed Jan. 22, 2020, the disclosure of which is incorporated, in its entirety (including the Appendix), by this reference.

This application includes the attached Appendix, which contains information that may provide further examples and/or details regarding one or more embodiments of the invention described herein. The entire contents of the Appendix are considered part of the present application and are incorporated herein in its entirety.

BACKGROUND

In conversation-based customer service systems, service agents and customer support personnel are typically organized in terms of the type, category or area in which they provide customers with assistance. For example, in an eCommerce context, some agents specialize in providing customer service or assistance with regards to payments/billing questions or tasks (i.e., they understand credit card processing, chargebacks, refunds, etc.) while other agents specialize in providing customer assistance with regards to fulfillment/shipping (i.e., they understand physical goods tracking, courier agencies practices and schedule, weather impacts, routing issues, etc.). Still other agents may be responsible for answering questions and assisting customers with tasks related to product information or warranties.

As a result of the segmentation of customer assistance agents, when an end-user (such as a customer or vendor) sends a message to customer service, it has to be routed to the department or group of agents best suited to answering the user's question or helping them to solve their problem. Traditionally, and in conventional systems, this has been accomplished by a manual review of a user's input and the determination by a person of the appropriate agent or group of agents to route the user's request or inquiry to. This means that someone is reading through every new incoming service request ticket and assigning it to the right department and then forwarding the ticket to that department.

However, manual performance of the evaluation and routing of service request tickets has multiple disadvantages, among which are at least the following:
- It is slow because a human is the bottleneck in the process and having multiple humans coordinate this work across a large set of service requests is another inefficient aspect of the process;
- It is error-prone because it is manual and based on human judgments. For example, there is often some amount of ambiguity in a service request (e.g., it's not always obvious whether a ticket should be classified as "billing" or "refund"); and
- It is tedious and uninteresting work, causing a relatively high churn rate among personnel in this role—this can impact recruiting, training and retention costs and staffing requirements.

These problems and others related to the conventional approach provide an incentive for companies to seek ways of partially or fully automating the evaluation and routing processes used for customer support requests. However, in many cases routing cannot be automated effectively with a set of rules, because as noted, there is often no clear pattern or consistency to how a user may phrase their request for assistance, nor is there an effective way to remove ambiguities that arise in interpreting user requests. For example, "I want my money back" needs to be classified as "refund" and there are no obvious keywords to automate such a rule (such as are used in email filtering rules).

Embodiments of the invention are directed toward solving these and other problems associated with conventional approaches to providing a conversational based customer service support system, individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments of the disclosure are directed to systems, apparatuses, and methods for providing a more effective customer service support system. In some embodiments, the systems, apparatuses, and methods include a user interface (UI) and process flow for implementing a conversation-based customer service support system. The user interface and associated processing enable a user/customer to quickly and accurately select an intent, goal, or purpose of their customer service request. In some embodiments, this is achieved by a set of user interface displays or screens and an underlying logic that provide a user with multiple ways of selecting, identifying, or describing the intent, goal, or purpose of their request for service or assistance. Further, the underlying logic operates to improve the accuracy of the system over time based on obtaining user feedback through their selection or the processing of entered text and the construction of a data structure representing possible user intents and the relationship between intents or categories of intents.

In some embodiments, the systems, apparatuses, and methods include a processing flow that provides multiple ways for a user/customer to navigate and select (or identify)

their desired intent or purpose in seeking customer assistance. In one part of the processing flow, a trained machine learning model and intent tree data are provided to a customer seeking assistance. The model and intent tree data may be provided in response to a customer launching a previously supplied customer service application. In some embodiments, the customer service application may be provided in response to the customer contacting a company.

The application is executed on the customer's device (such as a smartphone, tablet, laptop, desktop or other computing device) and operates to perform one or more of (a) generate a display of the intent tree data, (b) allow the customer to navigate, and if desired, select an intent in the intent tree, (c) allow the customer to provide text describing their reason for seeking assistance and cause the trained model to attempt to classify the input text with regards to its intent, (d) receive from the customer a confirmation of a selected intent from the intent tree or an identified intent from the model, and (e) provide the customer's selected intent, intent identified by the model or their entered text (in the situation where the customer does not confirm an intent) to a server or platform for routing to an appropriate "handler". In the case of a confirmed intent selected from the intent tree or a confirmed intent identified by the trained model, the message may be routed to a Bot, webpage URL, pre-defined task or workflow, or a person. In the case of the customer not confirming an intent, their message or text may be routed to a person for evaluation, labeling and routing, and in some cases then used as part of continued training of the model.

Note that although some embodiments of the system and methods will be described with reference to the use of a conversational interface and underlying logic as part of a customer service support system, embodiments may be used in other situations and environments. These may include commerce, finance, or the selection of other services or products. In some contexts, the described user interface and underlying logic may assist a user to submit a service request, discover a service or product of interest, initiate or complete a transaction, or generally express their goal or purpose in interacting with a system or service, as expressed by their intent, etc.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
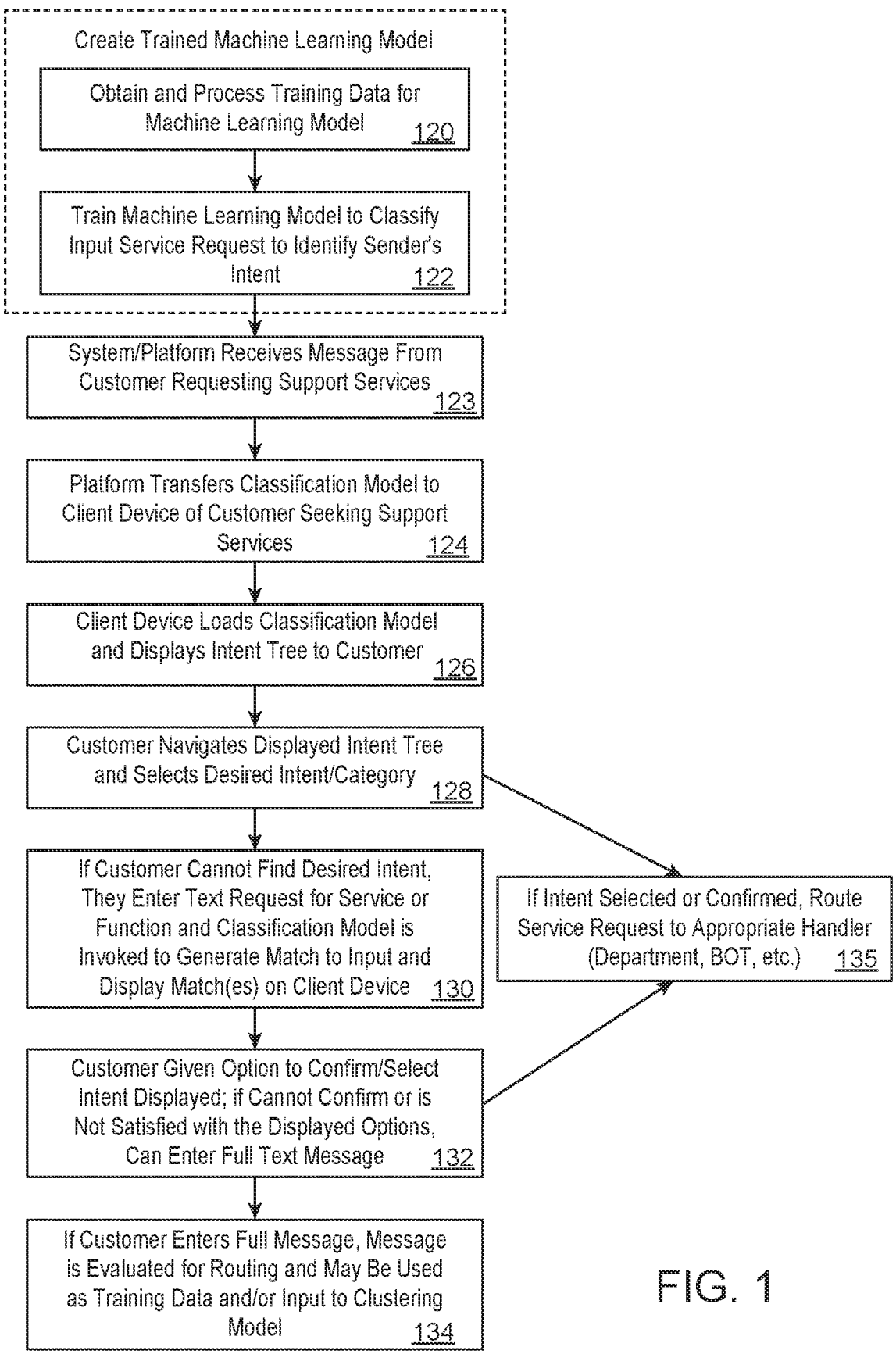
FIG. 1 is a flow chart or flow diagram of an exemplary computer-implemented method, operation, function or process for processing a user message requesting a service to determine a user's intent or the purpose of a user inquiry, in accordance with some embodiments of the systems and methods described herein.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the invention will be described more fully herein with reference to the accompanying drawings, which form a part hereof, and which show, by way of illustration, exemplary embodiments by which the invention may be practiced. The invention may, however, be embodied in different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or any other suitable form. The following detailed description is, therefore, not to be taken in a limiting sense.

The service request routing problem (or more generally, the interpretation and processing of a user's text message as provided by a conversational interface, such as a chat window or other format) is one to which Natural Language Processing (NLP) based Machine Learning (ML) models can be applied. Such models can be trained to learn implicit rules from actual text message data or examples. This means that if a suitable set of training data and labels/annotations are available, then a model may be trained to assist in identifying or classifying incoming service requests. Thus, if one has access to hundreds (or more) examples of messages and the corresponding labels or annotations (e.g., the correct group or department each message should be routed to), then a machine learning (ML) classification algorithm can be applied to create a model that will have a relatively high degree of accuracy and be able to perform (or at least assist in) the routing function.

While a trained Machine Learning model can be very helpful in routing a service request from a customer to the appropriate agent or subject matter expert, such models can be difficult for many organizations to create. For example, the labels used to annotate messages need to be clearly distinct from each other and to accurately reflect the workflow within the organization for handling service requests. In addition, the input data (message examples) needs to be "clean" and not subject to misinterpretation. This requires a company or organization using the model for routing service requests to provide appropriate training data and they may not understand how to do this effectively.

A second type of problem that may be encountered when attempting to implement an automated or semi-automated service request routing process is that workflows attached to such a system are automatically invoked without confirmation from the end-user, who may have had a different intention or goal of their request. For example, "I want my money back" may need to be classified as "refund", but "I got charged twice. I want my money back" may need to be classified as a "billing" issue instead. This can lead to frustration and dissatisfaction on the part of a customer/user and increased organizational resources being needed to resolve the problem and maintain customer goodwill.

Existing solutions to assist a customer/user to route their request to the appropriate customer service agent, process, or function are generally of two types:

(1) Static Menu

Figure 4:
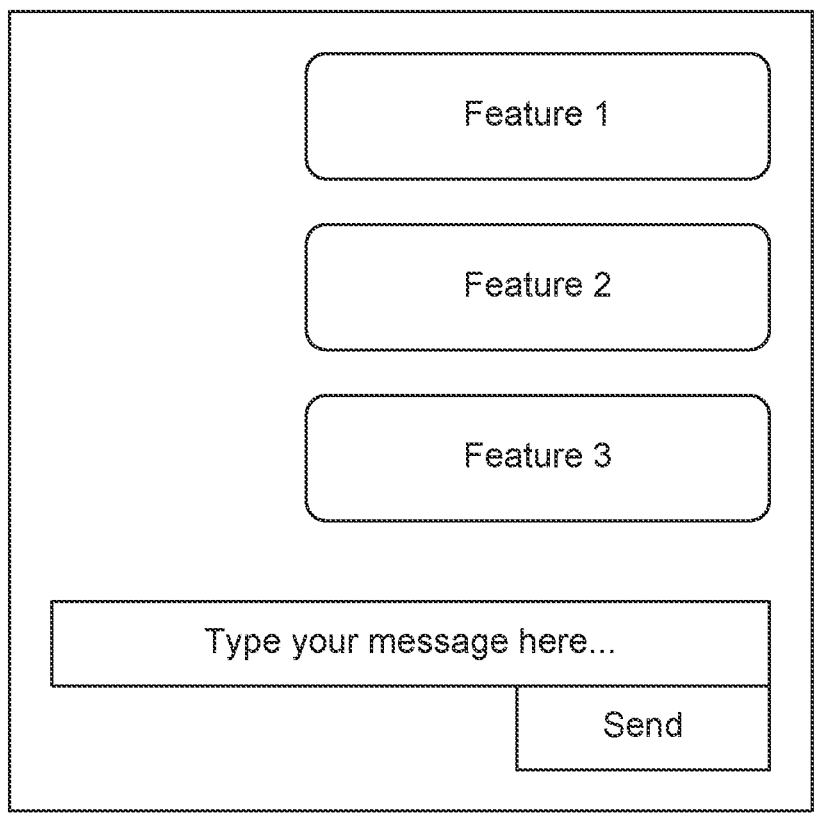
FIG. 4 is an illustration of an example of a static user interface display that an end-user may use to choose from a static list of issue titles or subjects.

A static menu interface is one where an end-user is asked to choose from a static list of issue titles or subjects. An example of such a user interface display is shown in FIG. 4. While helpful to some extent, the disadvantages of this approach include the following:

The end-user is expected to understand what each title means and to interpret it as intended by the person who assigned that title, e.g., a user may not understand the term "venue" and may be looking for "location" or "where"; and A company or brand is expected to pay attention to the major categories of incoming service tickets and be able to process those categories of messages by continually curating the list of issue categories in the static menu as new categories are needed or as currently available categories need to be redefined.

(2) NLP Based Routing

This type of solution is an NLP engine (e.g., Sin or Alexa). In this solution, there is a Natural Language Processing model that tries to understand the meaning of the sentence or phrase entered by a user, and each meaning is attached to a workflow. However, a problem with this approach is that human languages are very expressive, and people can have the same intent but express their request in different ways. This means that for a routing engine to be effective and correctly handle a large percentage of submitted requests, it would need to be trained for all of the possible (or at least the most likely) ways of expressing a request for a particular service. This places a burden on the company or brand wanting to use a trained model for routing service requests to have comprehensive training data, and even then, there is a low confidence level in achieving a desired level of success and often unclear expectations on the accuracy of the routing engine.

As another example, the assignee of the present disclosure/application has developed a customer service request issue classification service/model referred to as "Predict." Predict is a server-side text classification engine that is intended to determine the most likely label (typically a category or routing destination) for an incoming service request. However, the results are not exposed to the user and are only used for internal routing within the platform. The inputs used to train the Predict model are multiple pairs of data, with each pair comprising a label and a user's first service request message. The model is trained on these pairs using a supervised ML algorithm. Once the Predict model is trained, it operates to receive as an input a new user's first message, and in response it provides as an output a prediction of what the correct label for the message should be. When the classification/prediction has a sufficiently high-confidence level associated with it, the message is automatically routed to the group or department corresponding to the output label.

However, a limitation of this approach is that Predict operates to predict the correct "label" for a request on the server-side or service platform. An unfortunate consequence of this architecture is that if there is a workflow attached to the label, then the end-user is immediately taken to a bot or routine (or other form of handler) to execute the workflow. This can be a serious problem for the user in the situation where the classification or label was incorrect, as it can be both frustrating and inefficient. Further, as with the other approaches described, there are one or more possible problems that may occur as a result of the Predict processing flow:

1. Predict is expected to have a high degree of confidence in its predictions, so that once the confidence level for classifying a new message crosses a pre-set threshold, the system automatically applies the output of the model to the request/ticket. This means that the labels used to classify and route messages need to accurately reflect an organization's desired processing of requests. It also means that the labels (and hence routing possibilities) need to be regularly reviewed and corrected or updated to reflect how the organization is actually processing requests; and 2. Workflows attached to Predict are automatically invoked without confirmation or other feedback from the end-user, who may have had a different intention or goal of the request. This can lead to frustration and dissatisfaction on the part of a customer/user.

In some embodiments, the proposed solution and processing described herein overcomes these disadvantages by providing a form of compromise between, and improvement over, the approaches represented by existing solutions. In some embodiments, a user's request for assistance is associated with an "Intent", where an intent is an issue topic, subject or category that reflects the user's intention or purpose for seeking assistance (or in some cases, a goal of their interaction with a system as expressed by their intent). Typically, responding to an inquiry or assisting a customer to achieve an intent has a workflow associated with it, where the workflow may be performed by a "handler" such as a Bot, workflow, routine, or person. In the proposed solution described herein, a hierarchy or arrangement of intents (or data structure) that represents the relationships between different categories, sub-categories or classifications of intents is termed an "intent tree".

In some embodiments, the systems, apparatuses, and methods described herein provide an end-user with one or more of a user interface display, user-interface elements (such as a selectable "intent", a hierarchical intent tree, and/or a text entry field) and underlying data processing and user input processing logic, and may include:

- A dynamic (i.e., one able to be updated or changed) user interface (UI) which provides a user/customer with multiple ways of navigating a set of issue/intent categories and ways of helping them find the category that best matches their problem or purpose in seeking assistance, or the task, function or operation they desire to have performed, etc.;
  - This is beneficial, as it means an end-user is not expected or required to understand what each category title means, or which title represents a category or workflow that is most applicable to their problem or issue;
- A dynamic UI where new intents/categories can be displayed;
  - This means that the list of issue categories presented to a user/customer is not static and can display a different or updated list of intents when the user opens the conversational UI in a later session;
    - In some embodiments, the updated or revised list of intents or intent tree structure may be constructed based on a customer's previous interactions with customer service (such as the manner in which the customer expresses their requests using idiom or slang, or the manner in which prior requests were expressed and subsequently classified), an updated intent tree model for a company, an updated text message interpretation model for a company, etc.;
- In some embodiments, the UI may ask a user/customer to explicitly confirm their intent (i.e., that the assigned or selected category is a correct one for addressing their issue or desired operation);
  - This means that an end-user will not be surprised to see the workflow associated with that issue category; for example, the workflow can be a bot that "walks" them through the solution steps (e.g., forgot password) or a FAQ ("What is the shipping policy?"), or the request can be assigned to a queue where a human agent responds (e.g., reporting abuse); and
- If a user does not identify/select their desired intent as a result of their navigating through the intent tree display (or other form of representing the set of possible intents, such as a list, hierarchy, table, etc.), then the client application and/or remote system platform may enable the user to enter text into a field or user interface element and utilize the trained classification model to attempt to find a "best" match to the text. The trained model will operate to attempt to find a matching intent or intents to the user's text and then present the user with this list or set of intents for possible selection. Thus, in this aspect of some embodiments, text entered by a user is provided as an input to the trained model, with the output of the model being one or more "intents" that the model has classified the input text as representing. However, if the user's text does not sufficiently "match" an existing intent label or the end-user chooses not to select or confirm an intent suggested by the trained model, then embodiments permit the user to enter a full-text question or phrase specifying what they want or need;
  - In some embodiments, a match may depend on, for example, finding an exact match to text, finding a sufficiently close match to text, finding a match to synonyms of (or other ways of expressing) the text, etc.;
  - The full-text question or phrase is processed on the server-side (which in some embodiments, may include human interpretation of the text) to attempt to identify the most relevant existing intent label or topic. Under certain circumstances, the process may create a new intent category or sub-category that the company or brand can assign a title to and have added to the intent tree for use with future requests for assistance from customers;
    - In cases where the server-side processing determines that the request should be associated with an existing intent label or category, the initial request from the customer and the existing (correct) label may be used as additional training data for the classification model used to process requests for that specific company.

As will be described in greater detail with reference to FIGS. 1 and 2, embodiments of the user interface and supporting processing described herein provide 3 paths or sequences of navigation that are available to a user/customer as part of enabling them to select or specify their desired intent or purpose for requesting assistance. Although the embodiment illustrated in FIG. 2 represents an example of using a conversational UI in the context of a user seeking customer support assistance, it is noted that other use cases and contexts exist in which the system and methods described herein can be utilized to provide benefits to users and to the organizations receiving the user requests for assistance. These use cases and contexts include but are not limited to, commerce, finance, and the selection of other services or products. In some contexts, the described user interface and underlying logic may assist a user to submit a service request, discover a service or product of interest, initiate or complete a transaction, find information, or select a workflow to accomplish a goal or purpose, etc.

Figure 2:
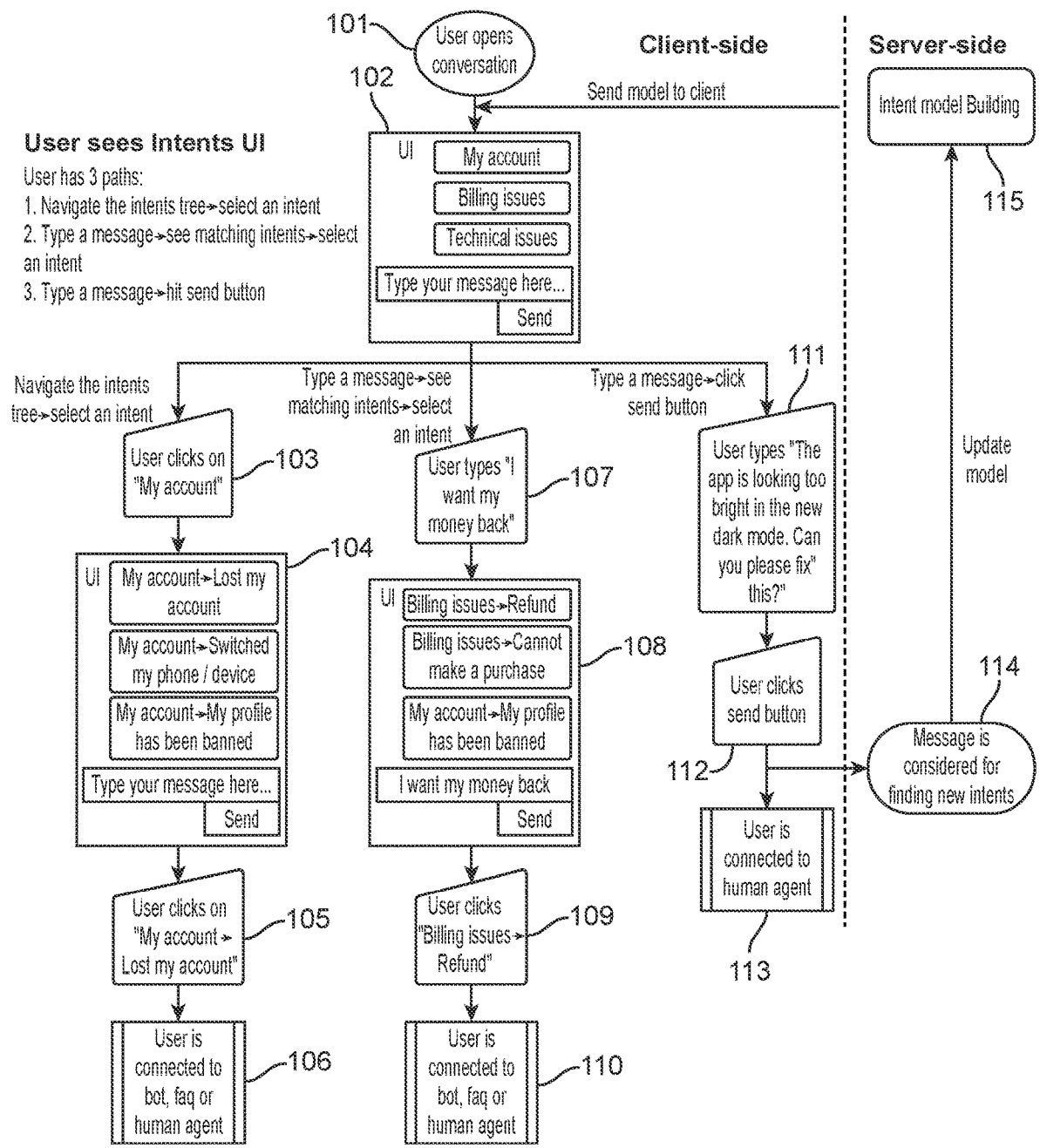
FIG. 2 is a more detailed flowchart or flow diagram illustrating the processing of a user message requesting customer service assistance to determine the user's intent or purpose, in accordance with some embodiments of the system and methods described herein.

FIG. 1 is a flow chart or flow diagram of an exemplary computer-implemented method, operation, function or process for processing a user message requesting a service to determine a user's intent or the purpose of a user inquiry, in accordance with some embodiments of the systems and methods described herein. As shown in the figure, an initial step is to collect or form a set of training data to be used in training a machine learning model (as suggested by step 120). In one embodiment, the training data set is comprised of a set of the first messages or requests sent by a plurality of users/customers along with an assigned label or classification for each message. The label or classification represents the "correct" category or routing of the message, as curated by a person familiar with the routing categories and classifications used by the brand or company whose customers generated the messages.

Thus, in this embodiment, a machine learning model is trained for use in processing incoming service requests from end-users to a specific company, business, vendor, or organization (referred to as the "company" herein). In this example, the company may have its own titles or task categories that are used for processing and routing incoming requests to specific work groups or departments. These titles or task categories will be reflected by the "correct" label(s) or annotations associated with a message or request. In a typical embodiment, this acquisition of training data and training of a machine learning model will occur on a server or platform.

In some examples, the training of the machine learning model may be performed or assisted by the entity providing the other functionality of the processing flow illustrated in FIG. 1. For example, the same entity that operates a system or services platform to provide message processing and routing services may provide tools to enable a company to upload a sample of customer service request messages and to enable an employee of the company to provide proper annotations or labels to those messages. The uploaded messages and labels can be used by the service platform provider to create the trained machine learning model for that company. The trained model is provided to the company's customers as described herein. In other examples, the company itself may generate the trained model and provide it to the entity operating the service platform.

Thus, in some embodiments, the entity operating the service platform for processing customer service requests (or providing that service through a multi-tenant platform operated by another entity) may provide a set of services through each account they administer on the platform. Each account may be provided with a set of functions and services, as described with reference to FIGS. 5-7. The functions and services may include one or more of the following:
- a processor service to train a machine learning model using the most relevant documents in a corpus of documents that represent examples of customer service requests that were (or might be expected to be) received by a company or organization;
- a process or service to provide the trained model and a data structure representing an "intent tree" of possible categories of requests for assistance to the company's customers when they request assistance, send a message to a customer support address, or launch a customer service application (or otherwise indicate a need for assistance);
- a process or service to provide an application (if it has not already been provided) to the company's customers to display and enable customers to "navigate" the intent tree, to select a desired intent or category of assistance, to confirm a selected intent, to allow a customer to insert text and have that text classified by the trained model, and to confirm their acceptance of the classification produced by the trained model;
- a process or service to allow a customer to insert text, a phrase, a question, or a sentence (as examples) into a field of a user interface and have the contents of the field provided to the server/platform for further evaluation and processing (typically by a person); and
- a process or service to provide a mechanism (typically either through the application or a service on the platform) to route a message or request to the appropriate "handler", task, workflow, Bot, URL, person or department of the company for resolution after determination of the customer's intent or goal in requesting assistance.

The model is trained using the set of training data so that it operates to receive as an input a text or other form of message from a user/customer and in response operates to output a label or classification of the input message, where the label or classification represents the correct category of the request or customer service topic and identifies where the request should be routed. Thus, the trained model operates to receive a user's service request or message and identify the intent or purpose of the user's service request or message (step 122).

The trained model is made available to the company to provide to customers requesting service and/or may be provided to customers by the entity providing the other functionality of a service platform, such as the message/request processing. In a typical example, the company or system/platform receives a text or other form of message requesting assistance from a customer (as suggested by step or stage 123). In some embodiments, the text or message may be sent by a customer to a server using the client-side application. For instance, a customer may inform a brand or company that they seek customer service assistance by using a text message sent to a customer service number. In some embodiments, a customer may instead send a snippet of text to a customer service email address. In some embodiments, the text message or snippet of text may be (re) directed to an account on the service platform. In some embodiments, the company may receive the text message or snippet of text and route it to the service platform.

In response to the customer's request, the system/platform or company transfers the trained intent classification model to a client device of the customer (step 124). If not already installed on the client device of the customer, the system/platform or the company may direct the customer to download and install a customer service application on their device. The client device loads the trained model and displays the intent tree to the customer by generating a display or screen showing the intent groups or categories and their relationships (typically in a visual and hierarchical form, although others, such as a list having multiple levels, are also possible to use) (step 126). In some embodiments, when a customer launches a client-side application, the system/platform may transfer the trained model and data representing an intent tree for a company to the customer.

The user or customer is able to navigate the displayed intent tree using user interface elements or controls on their device and if desired, select a category or subject title/label that best corresponds to the intent or purpose of their service request or message (step 128). If the user has selected an intent corresponding to their request for service, then the request is routed to the appropriate department (as suggested by step 135), either directly by the company or indirectly through the service platform.

If the user/customer is unable or chooses not to select one of the displayed intent groups or a specific intent type, then they may enter text and have that text used as a basis for finding a "match" to a label of the intent tree. In some embodiments, this may be done by enabling the user to enter text into a text box or field that is displayed. The entered text can be a partial or total phrase (such as one or more words) that the user believes describes the subject matter of their service request or the purpose of their interaction (such as to initiate a transaction, search for a product, find a specific piece of information about a product or service, etc.). As the user is entering text (or after completion of a word or phrase), the transferred classification model is invoked and used to generate one or more potential matches to the entered text, with that match or those matches displayed to the user on the client device (step 130). In some embodiments, the "match" processing described may be based on one or more of an exact match between a label and the user's text, a sufficient similarity to the user's text, and/or a match based on a synonym to (or other way of expressing) the user's text.

In some embodiments, the trained model may instead be executed on the server or platform side. In these embodiments, the trained model does not need to be provided to the client. Instead, the user's text would be transferred from the client to the server, the matching to intents would be performed on the server-side, and the results of the matching would be provided back to the client for display on the device.

The user is provided with an opportunity to select and/or confirm that one of the displayed intents corresponds to their intent or purpose for the service request. If the user confirms an intent corresponding to their request for service, then the request is routed to the appropriate department (as suggested by step 135) by the server or platform. Note that the confirmation stage or step may be provided in response to the user/customer selecting a displayed intent or category, or in response to the user entering text which is classified by the trained model, where the model is configured to provide one or more outputs representing the most likely intent or category corresponding to the input text.

If the user is unable or unwilling to select/confirm one of the displayed intents or one suggested by the trained model, then they can enter a full text message into a displayed field (step 132). The full text message is transferred to the server or platform hosting the classification model where it may be subject to routing and/or human assessment for ultimately assisting the user. Further, the transferred message may be used for purposes of training the model, updating how an intent is characterized, adding a new intent to the intent structure, processing using a clustering or other machine learning model to determine if the user's message should be associated with an existing group or subject, etc. (step 134). In some cases, the full text request may be evaluated by a human "handler" or curator to determine if the request should be associated with an existing category or label (and if desired, used as training data for the model), or if a new category, sub-category or label should be proposed for use with the customer's initial message as part of training the model for the company.

In some embodiments, the entity operating the service platform (such as the assignee of the present application) provides the functionality or capability for (a) customer messaging, (b) intent tree display and intent selection by a customer, and (c) intent classification based on customer text entry using a trained model to customers of the company. As noted, the data (previously received customer messages) and data labels used to train the model are provided by the company or with their assistance, with the model training being performed by the entity operating the service platform. The data labels are also used by the entity to build the intent tree or other list or structure of the possible intents. In some embodiments, the intent tree structure is built, curated and then used as part of the labeling/annotation for the model training process.

In some embodiments, the intent tree is displayed based on intent tree data provided to the client by the server upon a customer initiating a service request. In these embodiments, once a customer begins entering text into a messaging field in the application (or placing a cursor in a specific field or otherwise indicating a need for assistance, such as by launching the customer service application), the application may automatically generate a display showing the intent tree structure (for example, a hierarchical listing). Thus, in these embodiments, the downloaded client application loads the intent tree and the trained model into the customer's device. The application displays the intent tree in a list format, although other formats may be used (e.g., a graphical display). The user/customer may navigate the tree structure and select an intent that best corresponds to their intended request. In these embodiments, the trained model is not utilized when the user is navigating the intent tree using one or more user interface elements or controls.

If the customer does not select an intent from the navigation of the tree and enters text, then the trained model is invoked and used to attempt to find a match of the entered text to an intent. In this situation, the customer's entered text is treated as a model input and the trained model operates to generate an output representing the label or classification for the input. The label or classification corresponds to the model's "best" estimate of the intent associated with the input text. The client application displays the most relevant intents from the results of the matching process on the client device. If the customer selects an intent either from the navigation of the intent tree structure or from the results of the matching process, then the user may be asked to confirm their intent and the request is routed to the appropriate handler by the server or platform (as suggested by step or stage 135). If the user does not select and/or confirm an intent (whether from the displayed intent tree structure or provided by the output of the trained model), then the user provided message may be used as feedback or additional training data for the clustering algorithm.

In some embodiments, the intent tree contains the names of the intents as well as information on their organization and layout (e.g., their hierarchical structure and relationships). The trained model is used when searching the intent tree based on user-provided (typed) text or messages. For surfacing the most-likely intent(s) for a given user text input, the model (for finding the best matching intent), as well as the intent tree (for intent names and hierarchical information), are used.

FIG. 2 is a more detailed flowchart or flow diagram illustrating the processing of a user message requesting customer service assistance to determine the user's intent or purpose, in accordance with some embodiments of the system and methods described herein. In the example shown in FIG. 2, a screen display or displays are presented to a user to assist them to select the appropriate category corresponding to their request for customer service support, as suggested by steps 126 and 128 of FIG. 1. In some embodiments, the request/message processing system (the combination of client and server-side processing), platform, device, or service may implement one or more of the following functions, operations, or methods.

Intent Tree Curation
  The processing illustrated in FIGS. 1 and 2 typically
    begins with a corpus of user messages sent to a company (e.g., the first message sent by a set of end-users/customers of a company in a service request ticket);
  Next, the system platform executes a clustering algorithm
    or other machine learning algorithm to generate broad groups of issue categories represented by the corpus (further details regarding a clustering process that may be used are described in U.S. Provisional Application No. 62/964,548, entitled "System, Apparatus and Methods for Providing an Intent Suggestion to a User in a Text-Based Conversational Experience with User Feedback," referred to previously in this application);
  Then, a person with contextual knowledge of the company or brand's business and the desired workflows for responding to customer service or assistance requests curates an intent tree from the clusters. In some cases, this amounts to assigning a label or annotating the clusters of messages in the corpus and organizing them into a structure that represents the relationships between groups and sub-group of messages, and between groups of messages and the desired workflow processing of the company.

As mentioned, in some embodiments, the system and process described herein may use the comprehension and inputs of a person acting as a curator to assign succinct and descriptive titles to the clusters. In some embodiments, this labeling or curation may be performed in an automated or semi-automated fashion using a trained machine learning model. In one embodiment, an automated or semi-automated approach may include:

labeling clusters by their most representative keyphrases;
labeling clusters by using the most frequent words (or phrases) in the documents assigned to the cluster; or
applying text summarization techniques on the documents assigned to the cluster to determine cluster labels).

In one example, an Intent Tree or Intent Hierarchy may be constructed using a bottom-up approach: first the clusters on the most granular (bottom) layer of the clustering are named. If appropriate, these Intents may be grouped into several groups or "parent" categories. For the purpose of naming or surfacing, these parent or higher-level categories of intents are considered an aggregation of the curated Intents grouped within them.

For example, below is a possible intent tree for a gaming company:
1. My account—this is an example of a "parent" category
   a. Lost my account—this is an example of a sub-category
   b. Switched my phone/device
   c. My profile has been banned
2. Billing issues
   a. Cannot make a purchase
   b. Refund
3. Technical issues
   a. App crashes
   b. App is slow
   c. App is not working Because the system has generated these intents (issue categories) from the message corpus, the company can have a high degree of confidence that this covers a majority of their customers' problems. Note that although the intent tree example refers to account, billing, and technical "issues", an intent tree may reflect other possible areas where a customer may seek assistance. These may include but are not limited to assistance with one or more of billing, an account, a purchase, a product, product information, a warranty, or a service.

When (or after) this set of intents is curated, the system also gathers the top few hundred relevant user messages associated with each intent (typically from the results of the clustering process or processing) and uses the combination of intent title (label/annotation) and user message (text) as input data for an issue/text classification machine learning (ML) algorithm, which is used to train a machine learning model, as suggested by block 115 of FIG. 2. An example flow of how a user interacts with the system is as follows:

User opens/initiates a "conversation" seeking assistance
In block 101, the user opens the conversational UI—this is typically generated by a client application installed on the user's device.

User is shown UI
They are shown a UI as illustrated or suggested in block 102 (note that this is an example of the initial UI or screen that may be displayed to a user).

In one example, the UI consists of 2 sections: a top section shows a top level of intents (in this example, "My account", "Billing issues" and "Technical issues") and a bottom section shows a text input region or field where the user is able to type a message. As this is an example, note that other numbers, types and/or arrangements of UI elements or data entry fields may be utilized.

Along with the curated tree structure, the Intent model (block 115) is sent from the server to the client application/device.

3 Paths of Navigation are Provided for a User/Customer
In some embodiments, at this stage, the user has 3 possible paths of navigation or ways of interacting with the message processing system:
1. Navigate the intents tree→select an intent (and in some embodiments, confirm the selected intent);
2. Type a message or message fragment→use message or fragment as input to trained model—model operates to output "predicted" intent of user by "matching" input to labels of intent tree→client-side application displays results of processing by model and allows user to select an intent (and in some embodiments, confirm the selected intent); and
3. Type a fuller message→user sends message to server for server-side processing and further evaluation of intent associated with message.

Note that in existing static menu-based solutions, there are 2 paths of navigation (navigate intents or type message and send for processing), while in existing NLP routing solutions, there is only 1 path of navigation (type message and send for processing). However, as described, both conventional approaches are limited in terms of the accuracy and efficiency they provide for customers.

Path 1: Navigate the intents tree→select an intent
In block 103, a user can select/click on the "My account" top-level intent category;
User is shown UI as depicted in block 104—this shows a second level of intents;
In block 105, user selects/clicks on "My account—Lost my account". In this example, the second level of intents is the last level, which means the system has now identified the user's intention or desired form of assistance, as being represented by one of the intents in the list of intents;
In block 106, the user is now connected to a predefined workflow or "handler", such as a well-defined bot (a predefined series of steps that is automated), or a specific FAQ that answers the question (e.g. "What is the refund policy?"), or can be connected to a human agent.

Path 2: Type a Message or Message Fragment→See Matching Intents→Select Intent
If the user does not wish to navigate the intent tree or perhaps the user does not understand what the different intent titles mean, they have the ability to type a message into a text box or other UI element.

In block 107, the user types a message, in this example, they type "I want my money back.";
In some embodiments, instead of the user entering text, they (or the company) may instruct the application to attempt to "match" their original message requesting assistance to an intent using the trained model;

This triggers a client-side matching process, using the trained model (which, as mentioned was provided from the server to a client device in block 115);

Once the model generates a new suggestion matching or partially matching what the user has typed, the UI is updated to show the possible matching intents, as depicted in block 108;

note that this type of "matching" may be one or more of seeking an exact match, a similarity-based match, a match based on a synonym or common phrasing to the entered text, etc.;

If a user finds an intent they believe is relevant to what they have typed, they can select that intent. In this example, the user selects/clicks "Billing issues→Refund." (block 109);

As the user has affirmed/confirmed their intention in the predefined list of intents, they are now connected to the predefined workflow or handler, such as a well-defined bot (a predefined series of steps that is automated), or a specific FAQ that answers the question (e.g. "What is the refund policy?"), or can be connected to a human agent (block 110).

Path 3: Type a Fuller Message→Click Send Button to Initiate Server-Side Processing The user can also (or instead) type a full question or message. In this example, in block 111, the user types "The app is looking too bright in the new dark mode. Can you please fix this?";

This input does not match any existing intents (as would happen through the processing described with reference to block 108), so the user proceeds to click the send button to send the entered message to a server for processing, as depicted in block 112;

Since no intent was selected, the user is connected to a predefined default workflow or handler, such as being connected to a human agent, as depicted in block 113;

These messages are collected and may be used as training data for the Machine Learning model (as suggested by block 114) and to update and revise the model and the intent tree.

If, after further evaluation, the message is determined to match an existing intent with sufficiently high confidence, then it is possible that the end-user may not have understood the intent titles; if this situation becomes quantitatively significant, then the information could be provided as feedback to the company or brand as a suggestion that their titles/classifications/labels could use clarification or improvement. In this situation, the customer's initial message and the determined correct existing label or intent may be used as further training data for the model so that it will correctly classify similar messages in the future.

As mentioned, if a user's message is determined to not match an existing intent, then they may be collected, and used as inputs to a clustering algorithm or used as part of training a model:

If the process detects new clusters, then the system or platform operator may consult with the company or brand on whether they wish to attach these types of messages to an existing intent or create a new intent in the intent tree;

If the company or brand wants to create a new intent, it is added on the server side, and when an end-user next opens the conversational UI, the new intent will be available for both navigation and matching operations.

In this way, companies or brands can update the classification mechanism as they discover new issues or new ways of phrasing existing issues and thereby ensure a majority of users' issues are discovered and covered by the processing flow.

The ability to perform Intent Selection on the Client Side (using for example, WebChat, In-App, Social channels) without the need of interactions with a backend server allows for routing decisions (and workflow selection and execution) to be made without a dependency on the system that is responsible for creating and maintaining the model. This reduces latency in assisting a user, increases customer satisfaction, and conserves resources (such as human customer service representatives) that might be better used for other purposes.

Although the architecture and message processing flow described herein do not place constraints on the number of parameters or sub-levels of intents that could be used to make the routing process comprehensive, the maintenance of such a system becomes more complex as it includes more parameters. As a result, it may be optimal to maintain the classification process granularity at the intent/sub-Intent level and allow for insertion of additional parameters or sub-processes to be managed by the system which is responsible for handling the workflows.

As an example, suppose there are two different ways/workflows for resetting a password, depending on the operating system involved (iOS/Android). Instead of maintaining two different Intents ("Reset my password (iOS)" and "Reset my password (Android)"), there may be only one "Reset my password" intent, which simplifies the tree navigation as well as tree and model maintenance. However, when the final intent selection and/or message is submitted from (or confirmed by) the user/customer, the system can utilize information regarding the operating system of the user's device to start the appropriate workflow on the server-side. Note that in some cases, this information would be available without direct interaction by the user.

Other differentiated workflows may exist that use information that does not require actual confirmation by the user since that information can be gathered from other sources (such as device metadata or third-party databases connected on the server-side). Additional examples for such aspects (in addition to the device operating system) may include device language, location, version of the app, a paying or free user, additional user profile information, etc.

This approach also allows the system to continue to evolve and become more context-aware as it develops the workflows in an intelligent fashion. For instance, a system could begin at first by transferring the control to the most appropriate channel (such as Voice) for handling requests from all users for a particular intent/sub-intent. It can later evolve into a more sophisticated decision engine using more personalized workflows based on contextual data pertaining to a user's profile or device characteristics, as well as their transaction history (or data relevant to a specific type or group of users).

The server-side processing logic for training of the machine learning model and responding to certain events are described in the co-pending U.S. Provisional Patent Application entitled "System, Apparatus and Methods for Providing an Intent Suggestion to a User in a Text-Based Conversational Experience with User Feedback", referred to previously.

As noted, in some embodiments, the inventive system and methods may be implemented in the form of an apparatus that includes a processing element and a set of executable instructions. The executable instructions may be part of a software application and arranged into a software architecture. In general, an embodiment of the invention may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the inventive system and methods. The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As described, the system, apparatus, methods, processes, functions, and/or operations for implementing an embodiment of the disclosure may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 3 is a diagram illustrating elements or components that may be present in a system, server, platform or computing device 300 configured to implement a method, process, function, or operation in accordance with an embodiment of the invention.

Figure 3:
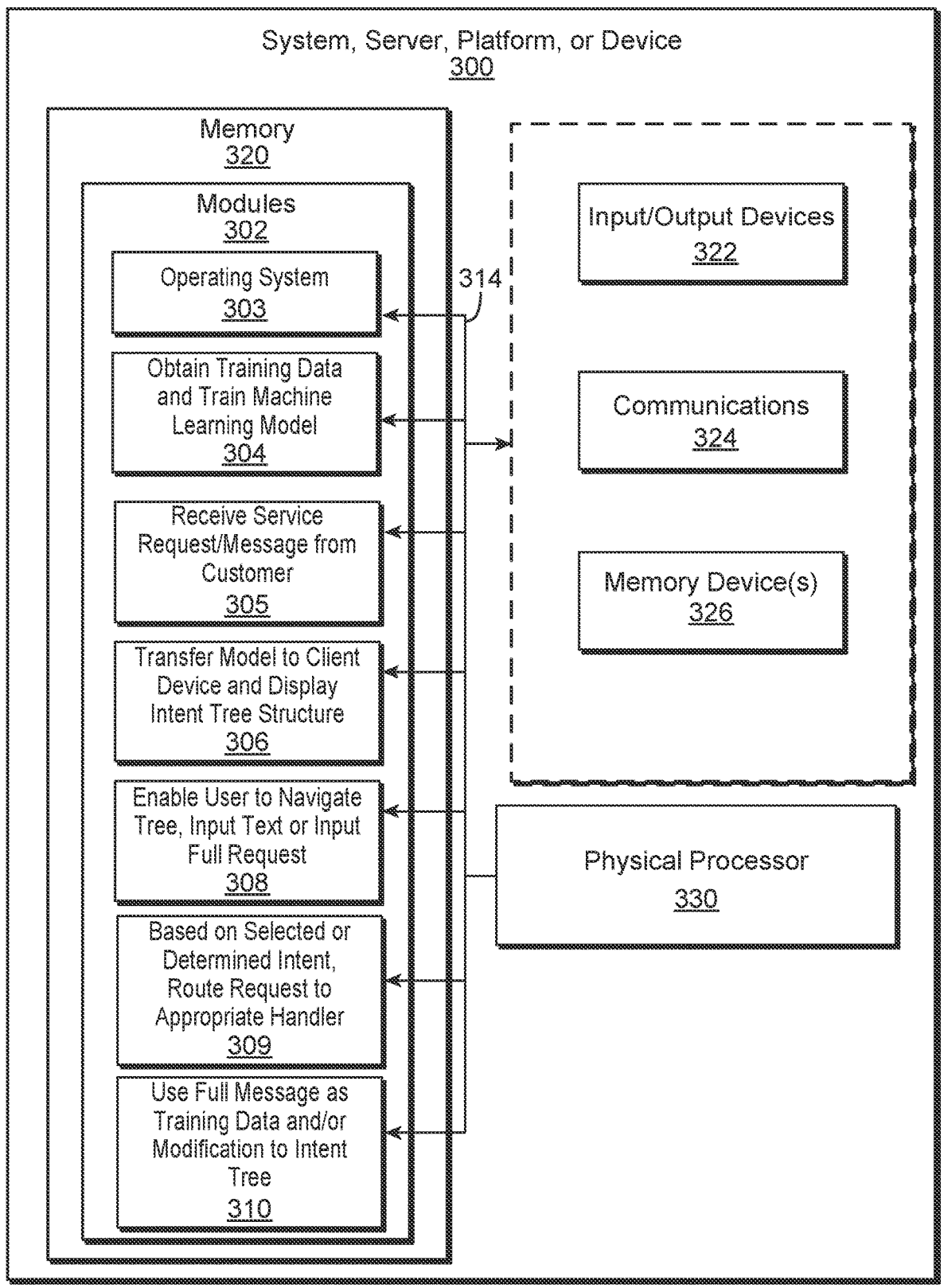
FIG. 3 is a diagram illustrating elements or components that may be present in a computing device or system configured to implement a method, process, function, or operation in accordance with some embodiments of the system and methods described herein.

The subsystems shown in FIG. 3 are interconnected via a system bus 314. Additional subsystems include may include input/output devices 322, communications elements 324, and additional memory or data storage devices 326. The interconnection via the system bus 314 allows one or more processors 330 to communicate with each subsystem and to control the execution of instructions that may be stored in a module 302 in memory 320, as well as the exchange of information between subsystems. The system memory 320 and/or the memory devices 326 may embody a tangible computer-readable medium.

Modules 302 each may contain a set of computer-executable instructions, which when executed by a programmed processor 330 will cause system, server, platform, or device 300 to perform one or more operations or functions. As mentioned, typically modules 302 include an operating system 303 which performs functions involved in accessing and transferring sets of instructions so that the instructions may be executed.

Note that the functions performed by execution of the instructions contained in modules 302 may be the result of the execution of a set of instructions by an electronic processing element located in a remote server or platform, a client device, or both. Modules 302 may include Obtain Training Data and Train Machine Learning Model Module 304 (which contains instructions which when executed perform some or all of the operations associated with steps 120 and 122 of FIG. 1), Receive Service Request/Message from Customer Module 305 (which contains instructions which when executed perform some or all of the operations associated with step 123 of FIG. 1), Transfer Model to Client Device and Display Intent Tree Structure Module 306 (which contains instructions which when executed perform some or all of the operations associated with steps 124 and 126 of FIG. 1), Enable User to Navigate Tree, Input Text or Input Full Request Module 308 (which contains instructions which when executed perform some or all of the operations associated with steps 128, 130 and 132 of FIG. 1), Based on Selected or Determined Intent, Route Request to Appropriate Handler Module 309 (which contains instructions which when executed perform some or all of the operations associated with step 135 of FIG. 1), and Use Full Message as Training Data and/or Modification to Intent Tree Module 310 (which contains instructions which when executed perform some or all of the operations associated with step 134 of FIG. 1).

As mentioned, each module may contain a set of computer-executable instructions. The set of instructions may be executed by a programmed processor contained in a server, client device, network element, system, platform or other component. A module may contain instructions that are executed by a processor contained in more than one of a server, client device, network element, system, platform or other component. Thus, in some embodiments, a plurality of electronic processors, with each being part of a separate device, server, or system may be responsible for executing all (or a portion) of the software instructions contained in an illustrated module.

Figure 5:
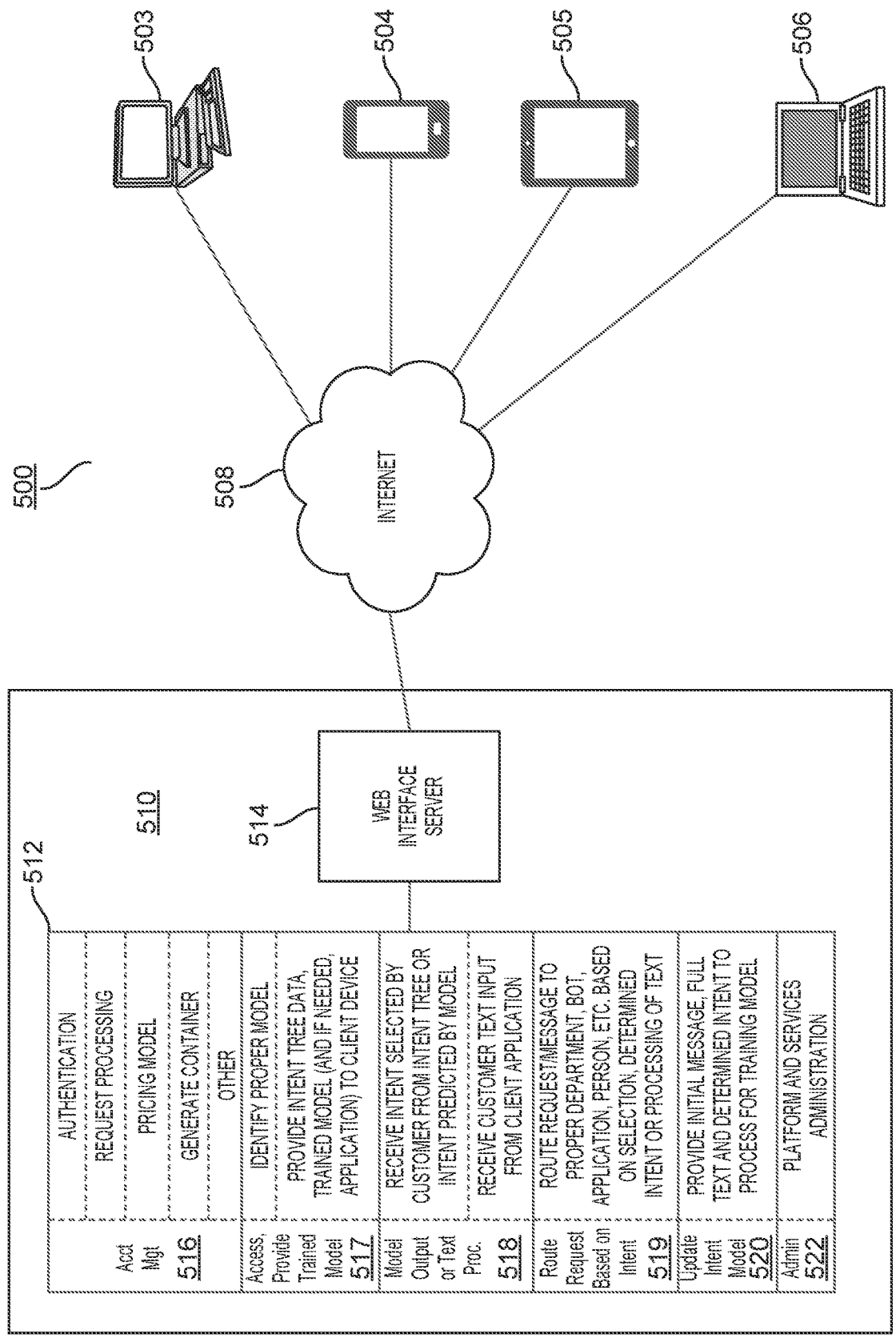
FIGS. 5-7 are diagrams illustrating a architecture for a multi-tenant or SaaS platform that may be used in implementing an embodiment of the systems and methods described herein.
Figure 6:
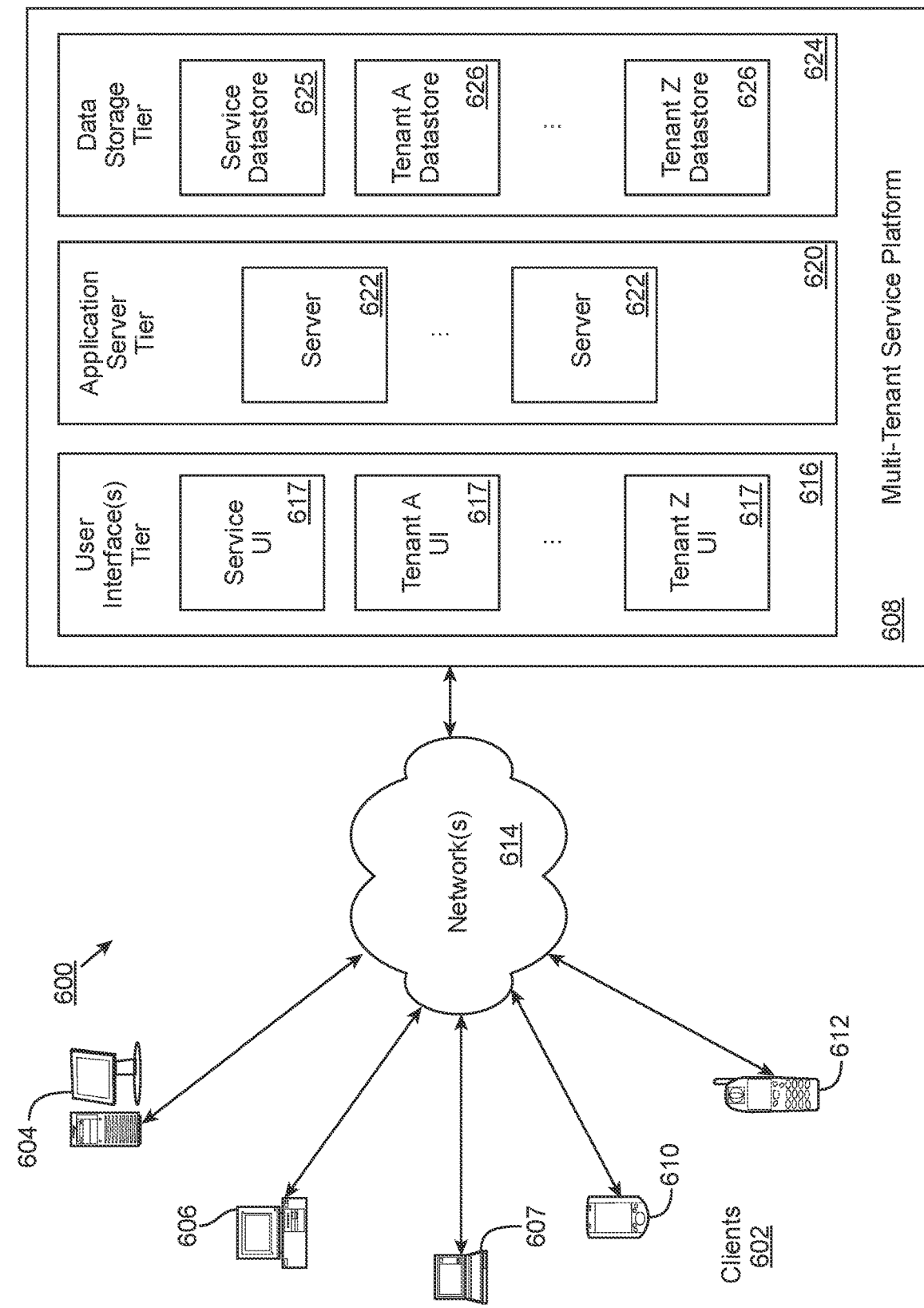
Figure 7:
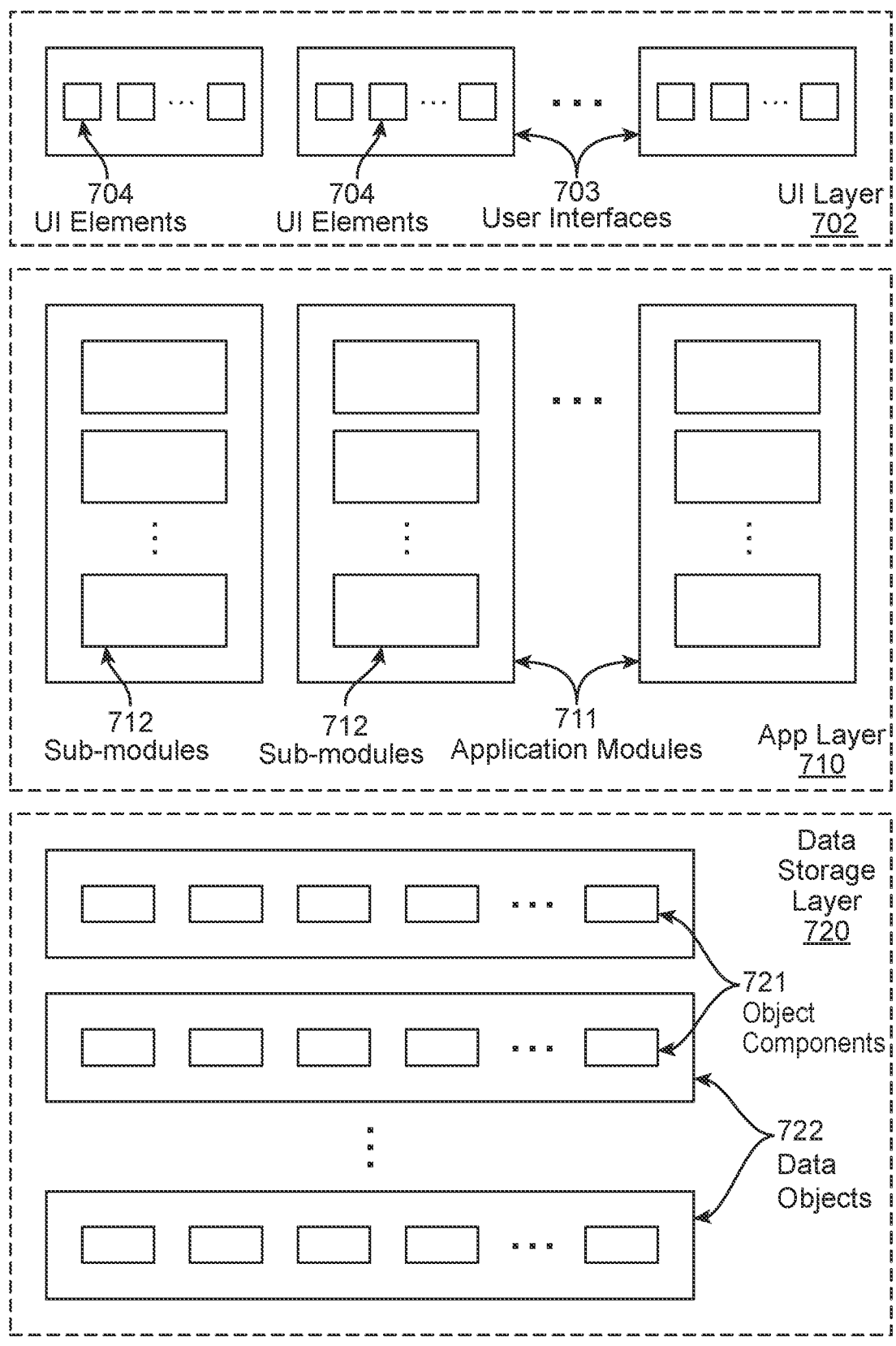

In some embodiments, the functionality and services provided by the system and methods described herein may be made available to multiple users by accessing an account maintained by a server or service platform. Such a server or service platform may be termed a form of Software-as-a-Service (SaaS). FIG. 5 is a diagram illustrating a SaaS system in which an embodiment of the invention/disclosure may be implemented. FIG. 6 is a diagram illustrating elements or components of an example operating environment in which an embodiment of the invention/disclosure may be implemented. FIG. 7 is a diagram illustrating additional details of the elements or components of the multi-tenant distributed computing service platform of FIG. 6, in which an embodiment of the invention/disclosure may be implemented.

In some embodiments, the request/message processing and routing system or service(s) described herein may be implemented as micro-services, processes, workflows or functions performed in response to the submission of a message or service request. The micro-services, processes, workflows or functions may be performed by a server, data processing element, platform, or system. In some embodiments, the services may be provided by a service platform located "in the cloud". In such embodiments, the platform is accessible through APIs and SDKs. The described request/message processing and routing services may be provided as micro-services within the platform for each of multiple users or companies, with each of those companies having a specific trained model and application available for download to their customers seeking assistance. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide request/message processing and routing services to assist end-users to resolve requests for customer support. Although in some embodiments, a platform or system of the type illustrated in FIGS. 5-7 may be operated by a $3^{rd}$ party provider to provide a specific set of business-related applications, in other embodiments, the platform may be operated by a provider and a different business may provide the applications or services for users through the platform. For example, some of the functions and services described with reference to FIGS. 5-7 may be provided by a $3^{rd}$ party with the provider of the trained models and client application maintaining an account on the platform for each company or business using a trained model to provide services to that company's customers.

FIG. 5 is a diagram illustrating a system 500 in which an embodiment of the invention may be implemented or through which an embodiment of the request/message processing and routing services described herein may be accessed. In accordance with the advantages of an application service provider (ASP) hosted business service system (such as a multi-tenant data processing platform), users of the services described herein may comprise individuals, businesses, stores, organizations, etc. A user may access the services using any suitable client, including but not limited to desktop computers, laptop computers, tablet computers, scanners, smartphones, etc. In general, any client device having access to the Internet may be used to provide a request or text message requesting customer support services and to receive and display an intent tree model. Users interface with the service platform across the Internet 508 or another suitable communications network or combination of networks. Examples of suitable client devices include desktop computers 503, smartphones 504, tablet computers 505, or laptop computers 506.

Request/Message Processing system 510, which may be hosted by a third party, may include a set of Request and Message Processing services 512 and a web interface server 514, coupled as shown in FIG. 5. It is to be appreciated that either or both of the request and message processing services 512 and the web interface server 514 may be implemented on one or more different hardware systems and components, even though represented as singular units in FIG. 5. Request/Message processing services 512 may include one or more functions or operations for the processing of received text or other messages or forms of requests for customer support services.

In some embodiments, the set of applications available to a company or user may include one or more that perform the functions and methods described herein for receiving a customer's message, providing and displaying an intent tree model to the customer, receiving and processing the customer's inputs to determine the customer's most likely intent or goal, and properly routing the customer's request to the appropriate bot, person, or application to provide them with assistance. As discussed, these functions or processing workflows may be used to provide a customer with a more efficient and effective response to their inquiry or request for customer support.

As examples, in some embodiments, the set of message processing and routing applications, functions, operations or services made available through the platform or system 510 may include:
account management services 516, such as
  a processor service to authenticate a person wishing to submit a customer service request (such as credentials or proof of purchase, verification that the customer has been authorized by a company to use the support services, etc.);
  a process or service to receive a request for customer support (or other indication of a customer's desire for assistance, such as by launching a customer service application) and prepare to provide the requester with a trained intent model and if not already provided, an application for installation on the customer's device;
  an optional process or service to generate a price for the requested service or a charge against a service contract;
  a process or service to generate a container or instantiation of the message processing and routing processes for the customer, where the instantiation may be customized for a particular company; and
  other forms of account management services.
a process or service for accessing an appropriate message classification model and providing it to the customer's client device 517, such as
  a process or service to identify the correct trained model to provide to the customer;
    in this case the "correct" model is the one corresponding to the company from whom the customer is requesting assistance (and may be indicated by the application the customer used);
  a process or service to provide the intent tree data and the appropriate trained model to the customer's/requester's client device, along with a supporting application (if needed and not already provided) to enable display and interaction with an intent tree data structure;
a processor service for processing the customer selection, model output or customer text input 518, such as
  a process or service that receives an intent selected by a user or a prediction or classification from the client application or trained model that represents the "predicted" or most likely to be correct intent of the requester based on text entered into a text entry field in the user interface;
  a process or service that receives and processes a partial or full text input from the requester in the situation where the requester is unable to select an intent from the intent tree or to determine a best fit to their intent using the trained model;
based on the determined intent (as a result of the customer selection, operation of the trained model or processing of the partial or full text provided by a requester), request routing processes or services 519, such as
  processes or services that function to route the request to the appropriate handler, such as a department, Bot, task or workflow, application, URL, or person based on the customer's selection, the intent determined/predicted by the model or further processing of the customer's text input (typically by a person acting as an evaluator);

a process or service to provide additional data to the intent model for use in further training and/or evaluation of possible improvements to the intent tree model, 520, such as a process or service to provide the customer's initial message (and if applicable, their more detailed text message) and the determined intent/label to a process for training and updating the intent tree and trained model; and administrative services 522, such as a process or services to enable the provider of the customer service request processing and routing services and/or the platform to administer and configure the processes and services provided to requesters.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", ..., "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity in order to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the message/request processing and routing described herein) are provided to users, with each company/business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the inventive system and methods, such as for one or more of the processes or functions described with reference to FIGS. 1, 2, 3, and 5:

- a processor service to train a machine learning model using the most relevant documents in a corpus of documents that represent examples of customer service requests that were (or might be expected to be) received by a company or organization;
- a process or service to provide the trained model and a data structure representing an "intent tree" of possible categories of requests for assistance to the company's customers when they request assistance, send a message to a customer support address, or launch a customer service application (or otherwise indicate a need for assistance);
- a process or service to provide an application (if it has not already been provided) to the company's customers to display and enable customers to "navigate" the intent tree, to select a desired intent or category of assistance, to confirm a selected intent, to allow a customer to insert text and have that text classified by the trained model, and to confirm their acceptance of the classification produced by the trained model;
  where the application is configured to generate a display or user interface including the intent tree and user interface elements to enable the selection, text input, confirmation, and other functions;
- a process or service to allow a customer to insert text, a phrase, a question, or a sentence (as examples) into a field of a user interface and have the contents of the field provided to the server/platform for further evaluation and processing (typically by a person);
- a process or service to provide the customer's initial message (and if applicable, their more detailed text message) and the determined intent/label to a process for training and updating the intent tree and trained model; and
- a process or service to provide a mechanism (typically either through the application or a service on the platform) to provide a customer's message or request to the appropriate "handler", task, workflow, Bot, URL, person or department of the company for resolution after determination of the customer's intent or goal in requesting assistance.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the invention may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. A trained neural network, trained machine learning model, or other form of decision or classification process may be used to implement one or more of the methods, functions, processes or operations described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Machine learning (ML) is being used more and more to enable the analysis of data and assist in making decisions in multiple industries. In order to benefit from using machine learning, a machine learning algorithm is applied to a set of training data and labels to generate a "model" which represents what the application of the algorithm has "learned" from the training data. Each element (or example, in the form of one or more parameters, variables, characteristics or "features") of the set of training data is associated with a label or annotation that defines how the element should be classified by the trained model. A machine learning model is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output.

The present disclosure includes the following numbered clauses:

Clause 1. A computer-implemented method for providing a customer with assistance, comprising:
generating a display of a set of customer assistance categories on a device;
enabling a user of the device to select one of the set of categories;
enabling the user to enter text into an element of a user interface display on the device;
providing the entered text as an input to a trained model, the trained model configured to determine a category in the set of categories that corresponds to the entered text;
enabling a user to confirm either their selection of one of the set of categories or the category determined by the trained model as their desired type of assistance; and
if the user confirms either their selection of one of the set of categories or the category determined by the trained model as their desired type of assistance, then providing a message from the user to a person or a bot, launching an application, or directing the user to a webpage to provide the user with assistance, wherein the person, bot, application, or webpage are associated with the category selected by the customer, the category determined by the trained model, or a label provided by a curator.

Clause 2. The computer-implemented method of clause 1, wherein the display of the set of customer assistance categories is a hierarchical list or tree structure.

Clause 3. The computer-implemented method of clause 1, wherein the trained model is executed on the device.

Clause 4. The computer-implemented method of clause 1, wherein the message from the user is a request for assistance with one or more of billing, an account, a purchase, a product, product information, a warranty, or a service.

Clause 5. The computer-implemented method of clause 1, wherein the trained model classifies the entered text and outputs a label that corresponds to one of the categories in the set of categories.

Clause 6. The computer-implemented method of clause 1, wherein an application on the device generates a user interface on the device that provides one or more elements to enable the user of the device to select one of the set of categories, to enable the user to enter text, or to enable a user to confirm either their selection of one of the set of categories or the category determined by the trained model as their desired type of assistance.

Clause 7. The computer-implemented method of clause 1, wherein the message from the user is provided to a remote server configured to route the message to the person, bot, application, or webpage are associated with the category selected by the customer, the category determined by the trained model, or the label provided by the curator.

Clause 8. The computer-implemented method of clause 1, further comprising using the message from the user and one of the category selected by the customer, the category determined by the trained model, or the label provided by the curator as training data for the model.

Clause 9. The computer-implemented method of clause 1, further comprising providing an application and a data structure representing a set of categories of assistance to the device, the application using the data structure to generate the display of the set of customer assistance categories.

Clause 10. A system for providing assistance to a customer, comprising:
a server configured to
receive an indication that a customer is requesting assistance;
in response to receiving the indication, provide a trained model to a device associated with the customer, the trained model configured to classify text input to the model by identifying a category of customer assistance corresponding to the input text;
an application for installation on the device associated with the customer, wherein when installed, the application configures the device to
generate a display of a set of customer assistance categories on the device;
enable the customer to select one of the set of customer assistance categories;
enable the customer to enter text into an element of a user interface display on the device;
provide the entered text as an input to the trained model, the trained model configured to determine a category in the set of customer assistance categories that corresponds to the entered text;

enable the customer to confirm either their selection of one of the set of categories or the category determined by the trained model as their desired type of assistance; and if the customer confirms either their selection of one of the set of categories or the category determined by the trained model as their desired type of assistance, then provide a message from the customer to a person or a bot, launch an application, or direct the customer to a webpage to provide the customer with assistance, wherein the person, bot, application, or webpage are associated with the category selected by the customer, the category determined by the trained model, or a label provided by a curator.

Clause 11. The system of clause 10, wherein the message from the customer is a text message.

Clause 12. The system of clause 10, wherein the indication that a customer is requesting assistance is one of receiving the message from the customer or determining that the customer has launched the application.

Clause 13. The system of clause 10, wherein the message from the user is a request for assistance with one or more of billing, an account, a purchase, a product, product information, a warranty, or a service.

Clause 14. The system of clause 10, wherein the display of the set of categories is a hierarchical list or tree structure.

Clause 15. The system of clause 10, wherein the server is further configured to use the message from the customer and one of the category selected by the customer, the category determined by the trained model, or the label provided by the curator as training data for the model.

Clause 16. The system of clause 10, wherein the server is further configured to provide a data structure representing the set of customer assistance categories to the device, the application using the data structure to generate the display of the set of customer assistance categories.

Clause 17. One or more non-transitory computer-readable media comprising a set of computer-executable instructions that when executed by one or more programmed electronic processors, cause the processors to provide assistance to a customer by:

generating a display of a set of customer assistance categories on a device;

enabling a user of the device to select one of the set of categories;

enabling the user to enter text into an element of a user interface display on the device;

providing the entered text as an input to a trained model, the trained model configured to determine a category in the set of categories that corresponds to the entered text;

enabling a user to confirm either their selection of one of the set of categories or the category determined by the trained model as their desired type of assistance; and if the user confirms either their selection of one of the set of categories or the category determined by the trained model as their desired type of assistance, then providing a message from the user to a person or a bot, launching an application, or directing the user to a webpage to provide the user with assistance, wherein the person, bot, application, or webpage are associated with the category selected by the customer, the category determined by the trained model, or a label provided by a curator.

Clause 18. The one or more non-transitory computer-readable media of clause 17, wherein the message from the user is a request for assistance with one or more of billing, an account, a purchase, a product, product information, a warranty, or a service.

Clause 19. The one or more non-transitory computer-readable media of clause 17, wherein the display of the set of categories is a hierarchical list or tree structure.

Clause 20. The one or more non-transitory computer-readable media of clause 17, wherein the processors are further configured to use the message from the user and one of the category selected by the customer, the category determined by the trained model, or the label provided by the curator as training data for the model.

Clause 21. The computer-implemented method of clause 1, further comprising if the customer does not confirm either their selection of one of the set of categories or the category determined by the trained model as their desired type of assistance, then processing a phrase or sentence input by the customer, wherein processing the phrase or sentence further comprises one or more of:

evaluating the phrase or sentence to determine if it should be assigned to one of the set of categories;

assigning a new category to the phrase or sentence;

using the phrase or sentence as training data and the assigned category as a classification for the phrase or sentence for the trained model; and providing the phrase or sentence to a person or a bot, launching an application, or directing the customer to a webpage associated with the assigned category.

Clause 22. The computer-implemented method of clause 21, wherein evaluating the phrase or sentence to determine if it should be assigned to one of the set of categories further comprises providing the phrase or sentence to a remote server for evaluation by the curator.

Clause 23. The system of clause 10, wherein if the customer does not confirm either their selection of one of the set of categories or the category determined by the trained model as their desired type of assistance, then the server is configured to process a phrase or sentence provided by the customer, wherein processing the phrase or sentence further comprises one or more of:

evaluating the phrase or sentence to determine if it should be assigned to one of the set of categories;

assigning a new category to the phrase or sentence;

using the phrase or sentence as training data and the assigned category as a classification for the phrase or sentence for the trained model; and providing the phrase or sentence to a person or a bot, launching an application, or directing the customer to a webpage associated with the assigned category.

Clause 24. The one or more non-transitory computer-readable media of clause 17, wherein if the customer does not confirm either their selection of one of the set of categories or the category determined by the trained model as their desired type of assistance, then the processors are configured to process a phrase or sentence provided by the customer, wherein processing the phrase or sentence further comprises one or more of:

evaluating the phrase or sentence to determine if it should be assigned to one of the set of categories;

assigning a new category to the phrase or sentence;

using the phrase or sentence as training data and the assigned category as a classification for the phrase or sentence for the trained model; and providing the phrase or sentence to a person or a bot, launching an application, or directing the customer to a webpage associated with the assigned category.

Any of the software components, processes or functions described in this application may be implemented as software code to be executed by a processor using any suitable computer language such as Python, Java, JavaScript, C++ or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A computer-implemented method for providing a customer with assistance, comprising:
    generating a display of a set of customer assistance categories on a device;
    enabling a user of the device to select one of the set of categories;
    enabling the user to enter text into an element of a user interface display on the device;
    providing the entered text as an input to a trained model on the device, the trained model configured to determine a category in the set of categories that corresponds to the entered text;
    enabling a user to confirm either their selection of one of the set of categories or the category determined by the trained model as their desired type of assistance; and
    if the user confirms either their selection of one of the set of categories or the category determined by the trained model as their desired type of assistance, then providing a message from the user to a person or a bot, launching an application, or directing the user to a webpage to provide the user with assistance, wherein the person, bot, application, or webpage are associated with the category selected by the customer, the category determined by the trained model, or a label provided by a curator.

2. The computer-implemented method of claim 1, wherein the display of the set of customer assistance categories is a hierarchical list or tree structure.

3. The computer-implemented method of claim 1, wherein the message from the user is a request for assistance with one or more of billing, an account, a purchase, a product, product information, a warranty, or a service.

4. The computer-implemented method of claim 1, wherein the trained model classifies the entered text and outputs a label that corresponds to one of the categories in the set of categories.

5. The computer-implemented method of claim 1, wherein an application on the device generates a user interface on the device that provides one or more elements to enable the user of the device to select one of the set of categories, to enable the user to enter text, or to enable a user to confirm either their selection of one of the set of categories or the category determined by the trained model as their desired type of assistance.

6. The computer-implemented method of claim 1, wherein the message from the user is provided to a remote server configured to route the message to the person, bot, application, or webpage are associated with the category selected by the customer, the category determined by the trained model, or the label provided by the curator.

7. The computer-implemented method of claim 1, further comprising using the message from the user and one of the category selected by the customer, the category determined by the trained model, or the label provided by the curator as training data for the model.

8. The computer-implemented method of claim 1, further comprising providing an application and a data structure representing a set of categories of assistance to the device, the application using the data structure to generate the display of the set of customer assistance categories.

9. A system for providing assistance to a customer, comprising:
    a server configured to
        receive an indication that a customer is requesting assistance;
        in response to receiving the indication, provide a trained model to a device associated with the customer, the trained model configured to classify text input to the model by identifying a category of customer assistance corresponding to the input text;
    an application for installation on the device associated with the customer, wherein when installed, the application configures the device to
        generate a display of a set of customer assistance categories on the device;
        enable the customer to select one of the set of customer assistance categories;
        enable the customer to enter text into an element of a user interface display on the device;
        provide the entered text as an input to the trained model, the trained model configured to determine a category in the set of customer assistance categories that corresponds to the entered text;
        enable the customer to confirm either their selection of one of the set of categories or the category determined by the trained model as their desired type of assistance; and
        if the customer confirms either their selection of one of the set of categories or the category determined by the trained model as their desired type of assistance, then provide a message from the customer to a person or a bot, launch an application, or direct the customer to a webpage to provide the customer with assistance, wherein the person, bot, application, or webpage are associated with the category selected by the customer, the category determined by the trained model, or a label provided by a curator.

10. The system of claim 9, wherein the message from the customer is a text message.

11. The system of claim 9, wherein the indication that a customer is requesting assistance is one of receiving the message from the customer or determining that the customer has launched the application.

12. The system of claim 9, wherein the message from the user is a request for assistance with one or more of billing, an account, a purchase, a product, product information, a warranty, or a service.

13. The system of claim 9, wherein the display of the set of categories is a hierarchical list or tree structure.

14. The system of claim 9, wherein the server is further configured to use the message from the customer and one of the category selected by the customer, the category determined by the trained model, or the label provided by the curator as training data for the model.

15. The system of claim 9, wherein the server is further configured to provide a data structure representing the set of customer assistance categories to the device, the application using the data structure to generate the display of the set of customer assistance categories.

16. One or more non-transitory computer-readable media comprising a set of computer-executable instructions that when executed by one or more programmed electronic processors, cause the processors to provide assistance to a customer by:
   generating a display of a set of customer assistance categories on a device;
   enabling a user of the device to select one of the set of categories;
   enabling the user to enter text into an element of a user interface display on the device;
   providing the entered text as an input to a trained model on the device, the trained model configured to determine a category in the set of categories that corresponds to the entered text;
   enabling a user to confirm either their selection of one of the set of categories or the category determined by the trained model as their desired type of assistance; and
   if the user confirms either their selection of one of the set of categories or the category determined by the trained model as their desired type of assistance, then providing a message from the user to a person or a bot, launching an application, or directing the user to a webpage to provide the user with assistance, wherein the person, bot, application, or webpage are associated with the category selected by the customer, the category determined by the trained model, or a label provided by a curator.

17. The one or more non-transitory computer-readable media of claim 16, wherein the message from the user is a request for assistance with one or more of billing, an account, a purchase, a product, product information, a warranty, or a service.

18. The one or more non-transitory computer-readable media of claim 16, wherein the display of the set of categories is a hierarchical list or tree structure.

19. The one or more non-transitory computer-readable media of claim 16, wherein the processors are further configured to use the message from the user and one of the category selected by the customer, the category determined by the trained model, or the label provided by the curator as training data for the model.

* * * * *